(12) United States Patent
Taherzadeh Boroujeni et al.

(10) Patent No.: US 11,706,810 B2
(45) Date of Patent: Jul. 18, 2023

(54) MESSAGE 2 REPETITION WITH TRANSMIT BEAM SWEEP AND ASSOCIATED BEAM REFINEMENT FOR MESSAGE 3 AND MESSAGE 4

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/178,852

(22) Filed: Feb. 18, 2021

(65) Prior Publication Data

US 2021/0266973 A1 Aug. 26, 2021

Related U.S. Application Data

(60) Provisional application No. 62/980,029, filed on Feb. 21, 2020.

(51) Int. Cl.
*H04W 72/044* (2023.01)
*H04W 74/08* (2009.01)
*H04W 72/23* (2023.01)

(52) U.S. Cl.
CPC ..... *H04W 74/0833* (2013.01); *H04W 72/046* (2013.01); *H04W 72/23* (2023.01)

(58) Field of Classification Search
CPC ........... H04W 74/0833; H04W 72/042; H04W 72/046
See application file for complete search history.

(56) References Cited

U.S. PATENT DOCUMENTS

2016/0143017 A1* 5/2016 Yang ............... H04L 5/0053
370/329
2016/0143019 A1* 5/2016 Hammarwall ..... H04B 7/0456
370/329

(Continued)

FOREIGN PATENT DOCUMENTS

WO 2018082017 A1 5/2018
WO 2018229555 A2 12/2018

OTHER PUBLICATIONS

International Search Report and Written Opinion—PCT/US2021/018798—ISA/EPO—dated Jun. 10, 2021.

*Primary Examiner* — Chi Ho A Lee
(74) *Attorney, Agent, or Firm* — Arent Fox, LLP/Qualcomm

(57) ABSTRACT

This disclosure provides methods, devices and systems for random access procedures and beam refinement for wireless communications. A base station may repeat a transmission of a random access message 2 to a user equipment (UE) on a plurality of physical downlink control channel (PDDCH) candidates to improve reception of the random access message 2 and provide for selection of a refined beam. The UE may receive the random access message 2 on the plurality of repeated PDCCH candidates during a random access response window. The UE may select an offset based on a strongest of the plurality of PDCCH candidates. The UE may transmit a random access message 3 on resources indicated by the random access message 2 that are time shifted by the offset. The base station may select a beam for transmitting a random access message 4 based on the offset.

34 Claims, 9 Drawing Sheets

(56) References Cited

U.S. PATENT DOCUMENTS

| | | | |
|---|---|---|---|
| 2016/0249331 A1* | 8/2016 | Park | H04L 5/0053 |
| 2020/0374960 A1* | 11/2020 | Deenoo | H04W 72/1284 |
| 2021/0105748 A1* | 4/2021 | Chen | H04W 72/042 |
| 2021/0105822 A1* | 4/2021 | Hakola | H04W 72/046 |
| 2021/0120557 A1* | 4/2021 | Takeda | H04L 1/1819 |
| 2021/0235425 A1* | 7/2021 | Kim | H04W 72/042 |
| 2021/0345416 A1* | 11/2021 | Hu | H04W 74/0833 |
| 2022/0015120 A1* | 1/2022 | Qiu | H04B 7/185 |
| 2022/0141869 A1* | 5/2022 | Jeon | H04W 74/0833 370/329 |
| 2022/0256585 A1* | 8/2022 | Yoon | H04W 16/28 |

* cited by examiner

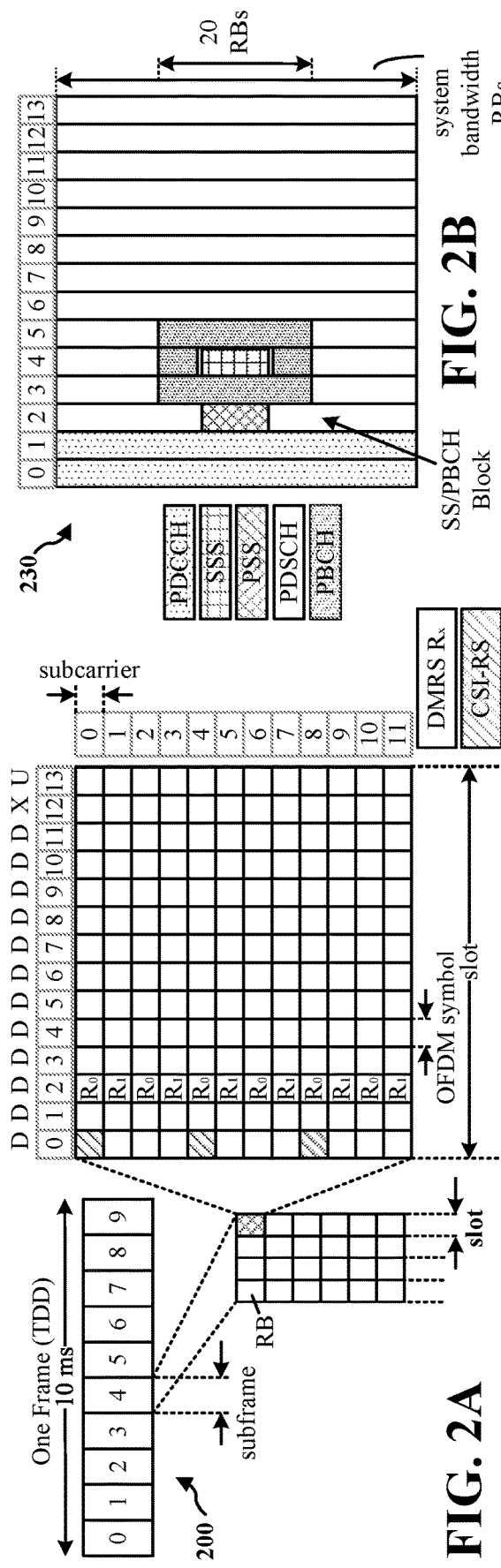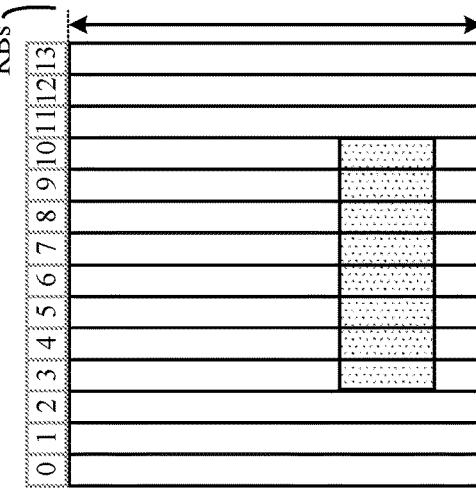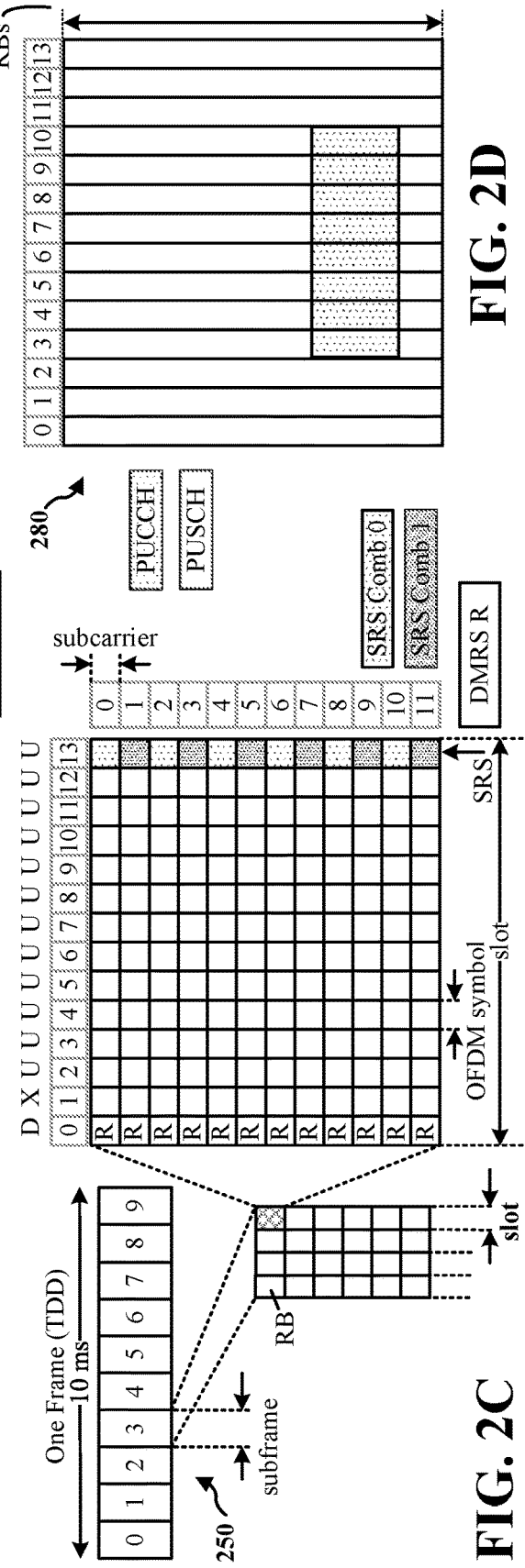
FIG. 2A
FIG. 2B
FIG. 2C
FIG. 2D

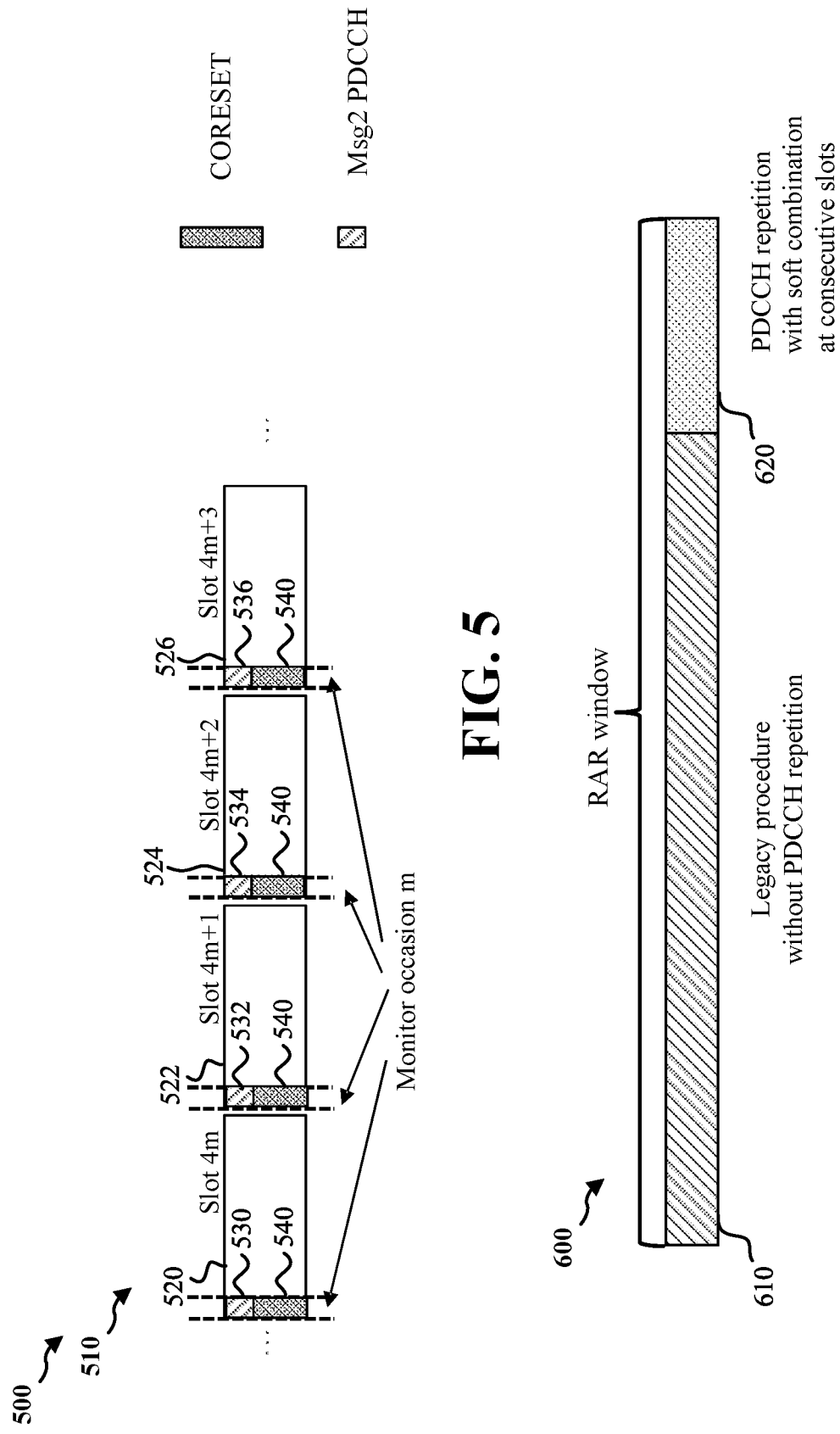

MESSAGE 2 REPETITION WITH TRANSMIT BEAM SWEEP AND ASSOCIATED BEAM REFINEMENT FOR MESSAGE 3 AND MESSAGE 4

CROSS REFERENCE TO RELATED APPLICATIONS

This application claims priority to U.S. Provisional Application No. 62/980,029 titled "MESSAGE 2 REPETITION WITH TRANSMIT BEAM SWEEP AND ASSOCIATED BEAM REFINEMENT FOR MESSAGE 3 AND MESSAGE 4," filed Feb. 21, 2020, which is assigned to the assignee hereof, and incorporated herein by reference in its entirety.

BACKGROUND

Technical Field

The present disclosure relates generally to wireless communication systems, and more particularly, to random access procedures and beam refinement for wireless communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication may include a random access procedure that allows a user equipment (UE) to initiate or resume communications with a base station. Under certain channel conditions, various messages of the random access procedure may not be received correctly, which may delay or prevent the UE from connecting to the base station. Wireless communication may include a random access procedure. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communications of a user equipment (UE) are provided. The method may include receiving, from a base station, a plurality of repeated physical downlink control channel (PDCCH) candidates for a single random access message 2 during a random access response window. The method may include transmitting a random access message 3 on resources indicated by the random access message 2. The resources for the random access message 3 are time shifted by an offset based on a strongest of the plurality of repeated PDCCH candidates. The method may include receiving a random access message 4 that is transmitted using a beam selected by the base station based on the offset.

In an aspect, the disclosure provides an apparatus for wireless communications. The apparatus may include a memory storing computer executable instructions and at least one processor coupled to the memory and configured to execute the instructions. The at least one processor may be configured to receive, from a base station, a plurality of repeated PDCCH candidates for a single random access message 2 during a random access response window. The at least one processor may be configured to transmit a random access message 3 on resources indicated by the random access message 2. The resources for the random access message 3 are time shifted by an offset based on a strongest of the plurality of repeated PDCCH candidates. The at least one processor may be configured to receive a random access message 4 that is transmitted using a beam selected by the base station based on the offset.

In an aspect, the disclosure provides another apparatus for wireless communication. The apparatus may include means for receiving, from a base station, a plurality of repeated PDCCH candidates for a single random access message 2 during a random access response window. The apparatus may include means for transmitting a random access message 3 on resources indicated by the random access message 2. The resources for the random access message 3 are time shifted by an offset based on a strongest of the plurality of repeated PDCCH candidates. The apparatus may include means for receiving a random access message 4 that is transmitted using a beam selected by the base station based on the offset.

In an aspect, the disclosure provides a non-transitory computer-readable medium storing computer executable code. The code when executed by a processor cause the processor to receive, from a base station, a plurality of repeated PDCCH candidates for a single random access message 2 during a random access response window. The code when executed by a processor cause the processor to transmit a random access message 3 on resources indicated by the random access message 2. The resources for the random access message 3 are time shifted by an offset based on a strongest of the plurality of repeated PDCCH candidates. The code when executed by a processor cause the processor to receive a random access message 4 that is transmitted using a beam selected by the base station based on the offset.

In an aspect of the disclosure, a method, a computer-readable medium, and an apparatus for wireless communications of a base station are provided. The method may include transmitting a plurality of repeated PDCCH candidates for a single random access message 2 during a random access response window. The method may include receiving a random access message 3 on resources indicated by the random access message 2. The resources for the random access message 3 are time shifted by an offset based on a strongest of the plurality of repeated PDCCH candidates. The method may include selecting a beam for transmitting a random access message 4 based on the offset. The method may include transmitting the random access message 4 using the selected beam.

In an aspect, the disclosure provides an apparatus for wireless communications. The apparatus may include a memory storing computer executable instructions and at least one processor coupled to the memory and configured to execute the instructions. The at least one processor may be configured to transmit a plurality of repeated PDCCH candidates for a single random access message 2 during a random access response window. The at least one processor may be configured to receive a random access message 3 on resources indicated by the random access message 2. The resources for the random access message 3 are time shifted by an offset that indicates a strongest of the plurality of repeated PDCCH candidates. The at least one processor may be configured to select a beam based on the offset. The at least one processor may be configured to transmit the random access message 4 using the selected beam.

In an aspect, the disclosure provides another apparatus for wireless communication. The apparatus may include means for transmitting a plurality of repeated PDCCH candidates for a single random access message 2 during a random access response window. The apparatus may include means for receiving a random access message 3 on resources indicated by the random access message 2. The resources for the random access message 3 are time shifted by an offset that indicates a strongest of the plurality of repeated PDCCH candidates. The apparatus may include means for selecting a beam for transmitting a random access message 4 based on the offset. The apparatus may include means for transmitting the random access message 4 using the selected beam.

In an aspect, the disclosure provides a non-transitory computer-readable medium storing computer executable code. The code when executed by a processor cause the processor to transmit a plurality of repeated PDCCH candidates for a single random access message 2 during a random access response window. The code when executed by a processor cause the processor to receive a random access message 3 on resources indicated by the random access message 2. The resources for the random access message 3 are time shifted by an offset that indicates a strongest of the plurality of repeated PDCCH candidates. The code when executed by a processor cause the processor to select a beam for transmitting a random access message 4 based on the offset. The code when executed by a processor cause the processor to transmit the random access message 4 using the selected beam.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G new radio (NR) frame.

FIG. 2B is a diagram illustrating an example of downlink (DL) channels within a 5G NR subframe.

FIG. 2C is a diagram illustrating an example of a second 5G NR frame.

FIG. 2D is a diagram illustrating an example of uplink (UL) channels within a 5G NR subframe.

FIG. 5 is a diagram illustrating example resources for repetition of a random access message 2.

FIG. 6 is a diagram illustrating an example portion of a random access response window for repetition of a random access message 2.

DETAILED DESCRIPTION

Figure 1:
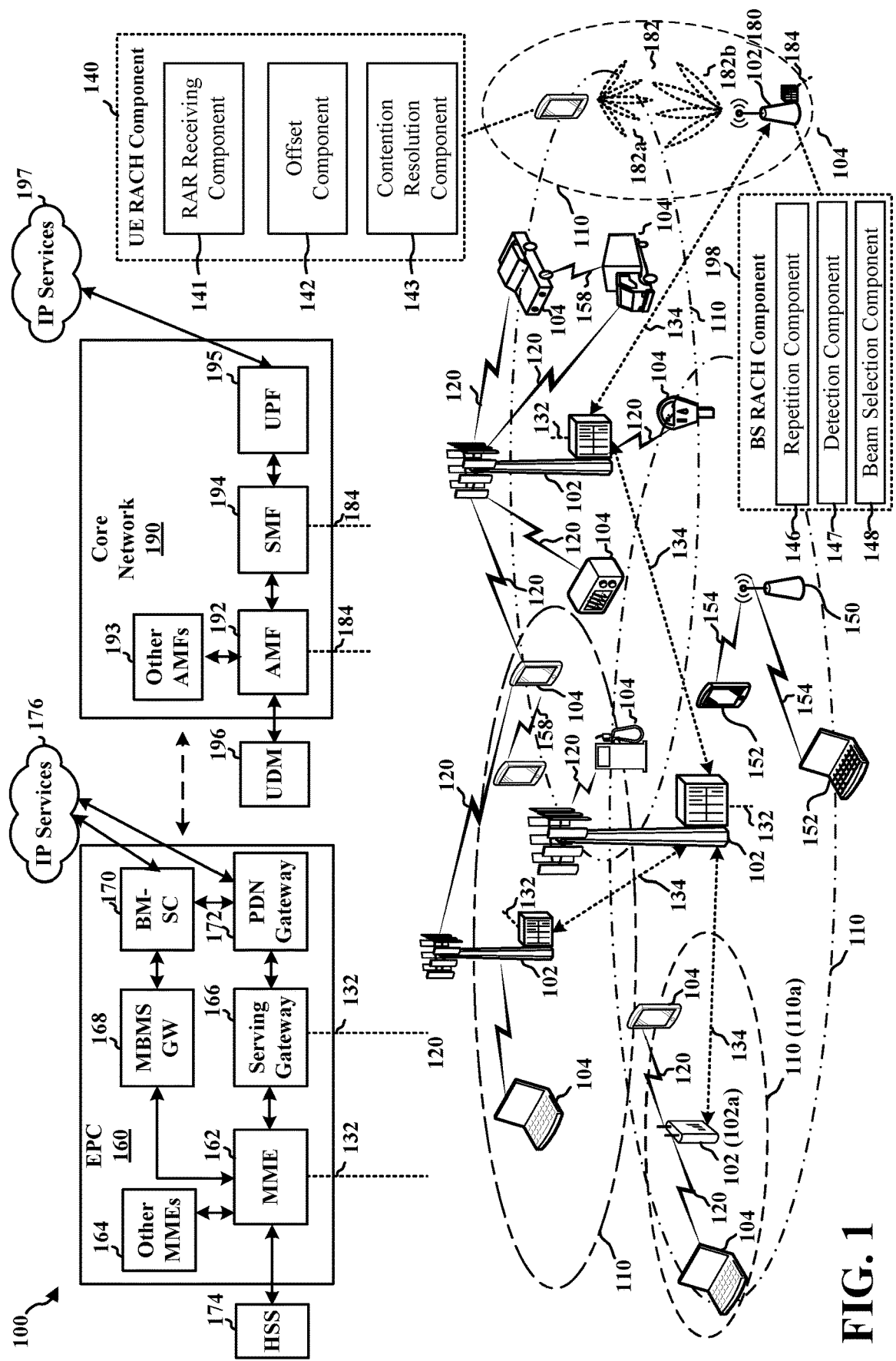
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

Using a random access channel (RACH) procedure, a user equipment (UE) may be able to initiate or resume communications with a base station based on an exchange of four messages between the UE and the base station. The messages for the RACH procedure may be referred to interchangeably as numbered random access messages (such as random access message 1), numbered RACH messages (such as RACH message 1), or abbreviated as a numbered "Msg" (such as Msg 1). Under some channel conditions, messages transmitted as part of the RACH procedure may not be received correctly. In particular, when high carrier frequencies are utilized, transmissions may be subject to high path loss. Beamforming between a user equipment (UE) and a base station may overcome the path loss experienced at high carrier frequencies. During a RACH procedure, however, beamforming between the UE and the base station may not be established, for example, because the UE has been inactive prior to the RACH procedure.

Various aspects of the present disclosure generally relate to random access procedures and beam refinement. In some particular aspects, a base station may transmit multiple repetitions of a RACH message 2, which may increase the likelihood that the RACH message 2 will be successfully received by a UE. Additionally, the base station may transmit the multiple repetitions of the RACH message 2 using different beams based on receiving a RACH message 1. The UE may receive the multiple repetitions of the RACH message 2 on multiple PDCCH candidates. In some implementations, the UE may soft combine the multiple PDCCH candidates and decode the RACH message 2 based on the combination. The UE may measure a received power of one or more of the multiple PDCCH candidates based on the decoded RACH message 2. The UE may select a strongest beam based on a respective measured received power for the multiple PDCCH candidates. In some such implementations, the UE may select a time offset based on the strongest beam and transmit a RACH message 3 with the time offset to indicate the strongest beam to the base station. For example, the UE may time shift the RACH message 3 by the time offset. The base station may receive the RACH message 3 at the time offset and select the refined beam for transmitting the RACH message 4 based on the time offset. The refined beam may improve the likelihood of successful reception for the RACH message 4.

Particular implementations of the subject matter described in this disclosure can be implemented to realize one or more of the following potential advantages. In some implementations, the described techniques can be used to improve reliability of the RACH procedure, and thus, facilitate access to a wireless network and establish a communication connection between a UE and a base station. For example, the UE may be able to more reliably receive the RACH message 2 PDCCH due to the repetition and the use of different beams. In some implementations, because the offset for the RACH message 3 indicates the best beam for the RACH message 2 PDCCH, the base station may select the best beam for transmission of the RACH message 4 such that the reliability of message 4 is also improved.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, one or more of the UEs 104 may include a UE RACH component 140 configured to perform a RACH procedure including receiving a plurality of repeated PDCCH candidates for random access message 2, also referred to as a random access response (RAR). The UE RACH component 140 may include a RAR receiving component 141 configured to receive a plurality of repeated physical downlink control channel (PDCCH) candidates for a single random access message 2 during a random access response window, an offset component 142 configured to transmit a random access message 3 on resources indicated by the random access message 2. The resources for the random access message 3 are time shifted by an offset selected based on a strongest of the plurality of repeated PDCCH candidates. The UE RACH component 140 may include a contention resolution component 143 configured to receive a random access message 4.

In an aspect, one or more of the base stations 102 may include a BS RACH component 198 configured to repeat transmissions of random access message 2 PDCCH candidates. The BS RACH component 198 may include a repetition component 146 configured to transmit a plurality of repeated PDCCH candidates for a single random access message 2 during a random access response window and a detection component 147 configured to receive a random access message 3 on resources indicated by the random access message 2. The resources for the random access message 3 are time shifted by an offset selected based on a strongest of the plurality of repeated PDCCH candidates. The BS RACH component 198 may include a beam selection component 148 configured to select a beam for transmitting a random access message 4 based on the offset. The BS RACH component 198 may include a transmission component (not shown) configured to transmit the random access message 4 using the selected beam.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
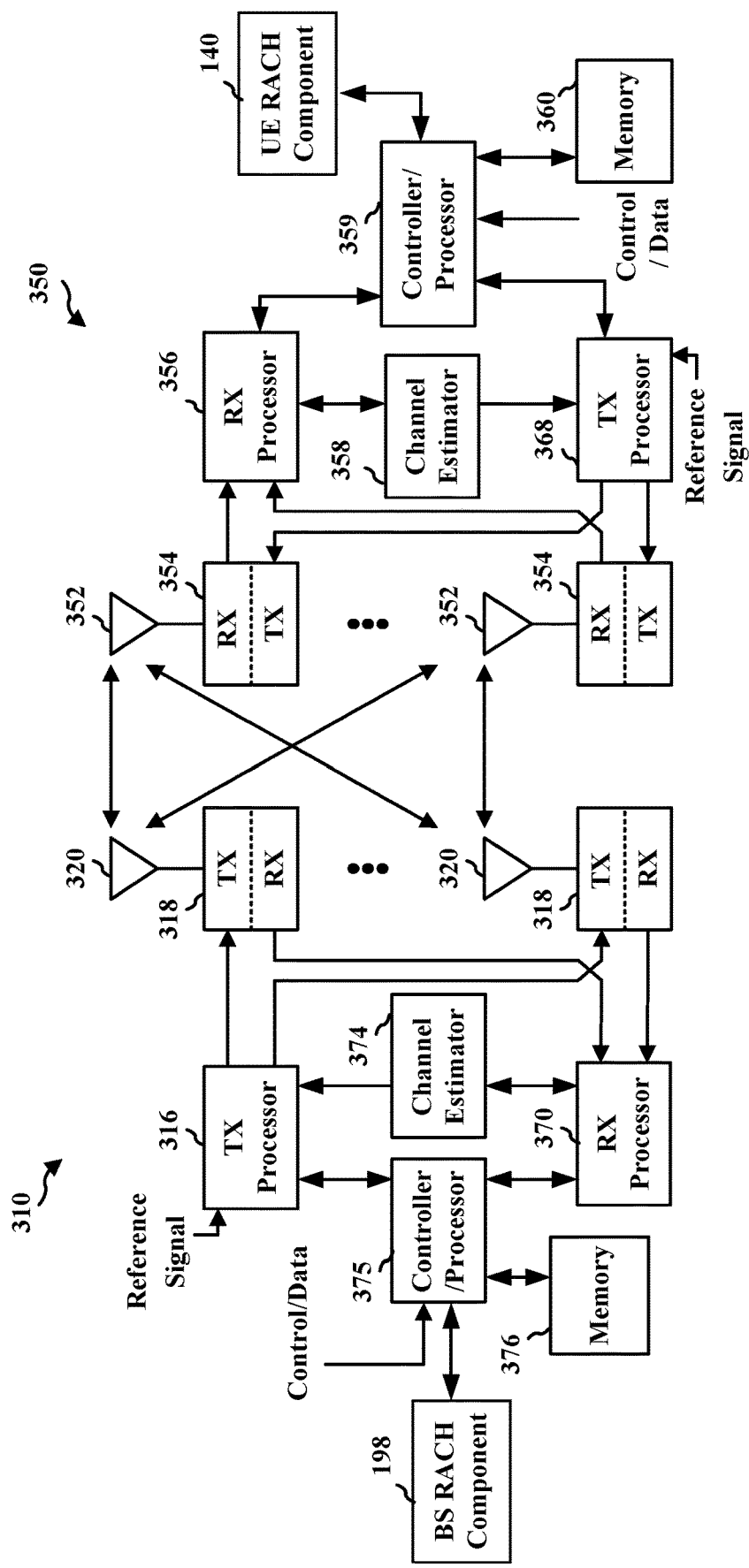
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the UE RACH component 140 of FIG. 1.

At least one of the TX processor 316, the RX processor 370, and the controller/processor 375 may be configured to perform aspects in connection with the BS RACH component 198 of FIG. 1.

Figure 4:
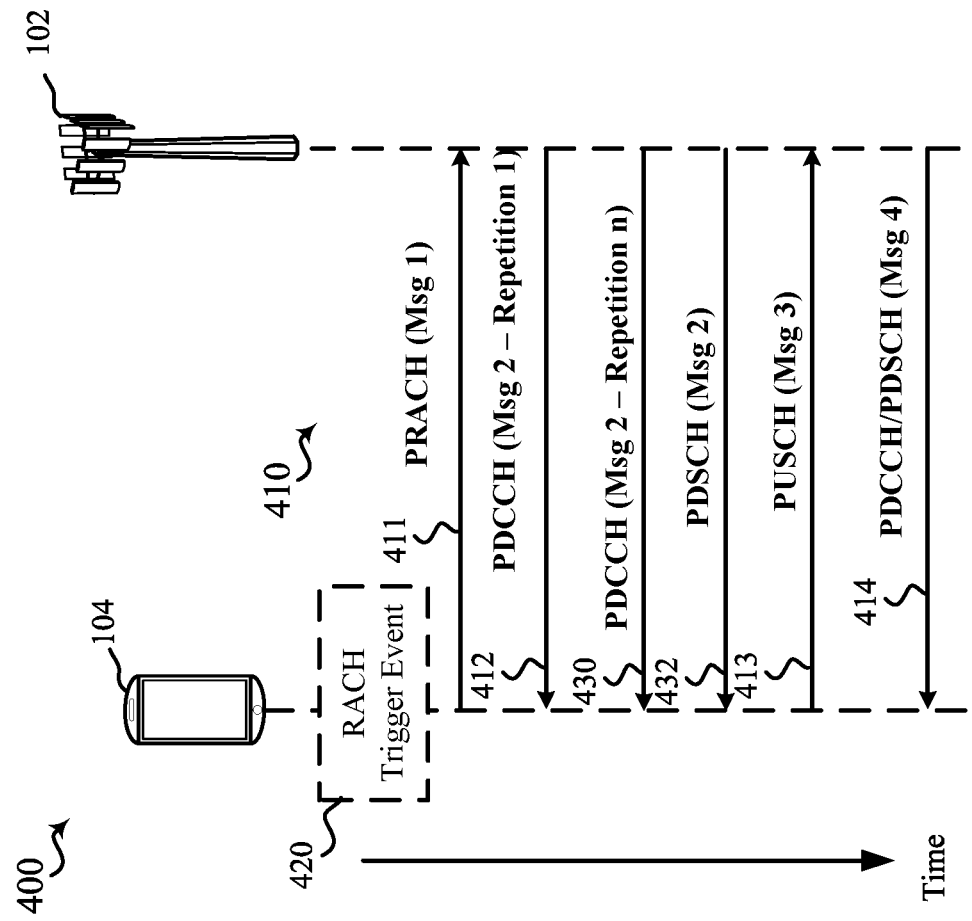
FIG. 4 is a diagram illustrating an example message exchange for a random access channel (RACH) procedure between a base station and a UE in an access network.

FIG. 4 is a diagram 400 illustrating an example message exchange for a RACH procedure between a base station 102 and a UE 104 in an access network. The UE 104 may be an NR-Light UE and include a UE RACH component 140. The base station 102 may include a BS RACH component 198.

Referring additionally to Table 1 (below), during operation, UE 104 may execute an implementation of an NR RACH procedure 410, according to a 4-step NR RACH message flow, due to the occurrence of one or more RACH trigger events 420. Suitable examples of RACH trigger events 420 may include, but are not limited to: (i) the UE 104 performing an initial access to transition from an RRC_IDLE state to RRC_CONNECTED ACTIVE state; (ii) the UE 104 detecting downlink (DL) data arrival during while in an RRC_IDLE state or RRC_CONNECTED INACTIVE state; (iii) the UE 104 determining UL data arrival from higher layers during RRC_IDLE state or RRC_CONNECTED INACTIVE state; (iv) the UE 104 performing a handover from another station to the base station 102 during the connected mode of operation; and (v) the UE performing a connection re-establishment procedure such as a beam failure recovery procedure.

The NR RACH procedure 410 may be associated with a contention based random access procedure, or with a contention free random access procedure. In an implementation, a contention based NR RACH procedure corresponds to the following RACH trigger events 420: an initial access from RRC_IDLE to RRC_CONNECTED ACTIVE; UL data arrival during RRC_IDLE or RRC_CONNECTED INACTIVE; and a connection re-establishment. In an implementation, a contention-free NR RACH procedure corresponds to the following RACH trigger events 420: downlink (DL) data arrival during RRC_IDLE or RRC_CONNECTED INACTIVE; and, a handover during the connected mode of operation.

On the occurrence of any of the above RACH trigger events 420, the execution of the NR RACH procedure 410 may include the 4-step NR RACH message flow (see FIG. 4 and Table 1), where UE 104 exchanges messages with one or more base stations 102 to gain access to a wireless network and establish a communication connection. The messages may be referred to as random access messages 1 to 4, RACH messages 1 to 4, or may alternatively be referred to by the PHY channel carrying the message, for example, message 3 PUSCH.

TABLE 1

NR RACH procedure, including Messages and Message Content transmitted over corresponding Physical (PHY) channel(s).

| PHY Channel | Message | Message content |
|---|---|---|
| PRACH | Msg 1 | RACH Preamble |
| PDCCH/ PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/ PDSCH | Msg 4 | Contention resolution message |

At 411, for example, UE 104 may transmit a first message (Msg 1), which may be referred to as a random access request message, to one or more base stations 102 via a physical channel, such as a physical random access channel (PRACH). For example, Msg 1 may include one or more of a RACH preamble and a resource requirement. In an aspect, the RACH preamble may be a relatively long preamble sequence, which may be easier for the base station 102 to receive than an OFDM symbol. In an aspect, the UE RACH component 140 may select a beam for transmission of the Msg 1 based on received synchronization signal blocks (SSBs) transmitted by the base station 102.

At 412, one of more of the base stations 102 may respond to Msg 1 by transmitting a second message (Msg 2), which may be referred to as a random access response (RAR) message, over a physical downlink control channel (PDCCH) and a physical downlink shared channel (PDSCH). In an aspect, the RAR receiving component 141 may receive the RAR message. The RAR receiving component 141 may monitor the PDCCH during a RAR window based on the Msg 1 to detect a PDCCH portion of the RAR message as a DCI format 1_0 with a CRC scrambled by the corresponding RA-RNTI and receive a PDSCH portion of the RAR message as a transport block in a corresponding PDSCH within the window.

In an aspect, at 430, the base station 102 may repeat the PDCCH portion of the Msg 2. That is, the base station 102 may repeat the Msg 2 on corresponding PDCCH candidates within a random access search space on consecutive slots. In an aspect, the BS RACH component 198 may determine whether to repeat the PDCCH portion of Msg 2 based on detection of a coverage enhancement condition. For example, the BS RACH component 198 may determine to repeat the Msg 2 based on a signal strength of the Msg 1. For instance, the BS RACH component 198 may repeat the Msg 2 when the signal strength of the Msg 1 is less than a threshold. The base station 102 may repeat the PDCCH portion of the Msg 2 using different refined beams. That is, the base station 102 may sweep beams for the PDCCH portion of the Msg 2. In an aspect, each of the different refined beams may be a sub-beam of a beam corresponding to the Msg 1. A sub-beam may refer to a lower level beam in a hierarchical set of beams. For example, a layer 1 (L1) beam may cover multiple L2 beams, which may each cover multiple L3 beams. In other words, the refined sub-beam may have a narrower aperture included within a wider aperture of the higher level beam. In an implementation, the beam corresponding to Msg 1 is an L2 beam and each of the different refined beams is an L3 beam. The L3 refined beams for the repetitions of the PDCCH portion of the Msg 2 may be based on an L2 beam used for the Msg 1. That is, the base station 102 may generate different sub-beams corresponding to the L2 beam to attempt to improve reception of the Msg 3.

The UE 104 or the RAR receiving component 141 may perform blind detection after soft combination of the PDCCH candidates. That is, the UE 104 may receive a signal corresponding to each of the PDCCH candidates, soft combine the signals received for each of the PDCCH candidates, and perform blind detection for the DCI on the combined signal. Accordingly, the UE 104 may be more likely to successfully detect the Msg 2 PDCCH. The RAR receiving component 141 may perform a separate reference signal received power (RSRP) measurement on the PDCCH candidates using the successfully decoded Msg 2 as a reference signal. The RAR receiving component 141 may select a PDCCH candidate and corresponding beam based on the RSRP (for example, the PDCCH candidate having the strongest RSRP).

At 432, the RAR receiving component 141 may receive a transport block in a corresponding PDSCH indicated by the PDCCH within the RAR window. The RAR receiving component 141 may pass the transport block to higher layers, which may parse the transport block for a random access preamble identity (RAPID) associated with the Msg 1. For example, Msg 2 may include one or more of a detected preamble identifier (ID), a timing advance (TA) value, a temporary cell radio network temporary identifier (TC-RNTI), a backoff indicator, an UL grant, and a DL grant. If the higher layers identify the RAPID in the transport block, the higher layers indicate an uplink grant to the RAR receiving component 141 at the physical layer. This is referred to as RAR UL grant in the physical layer.

At 413, in response to receiving Msg 2, UE 104 or the offset component 142 transmits to the base station 102 a third message (Msg 3), which may be an RRC connection request or a scheduling request, via a physical uplink channel such as PUSCH based on the RAR UL grant provided in Msg 2 of the serving base station 102. In an aspect, where the UE 104 has received the repeated Msg 2 PDCCH, the UE 104 may time shift the resources of the Msg 3 by an offset based on the strongest PDCCH candidate. For example, the offset may be a number of symbols or number of slots equal to the slot number of the strongest PDCCH candidate. In another aspect, the UE 104 may select a refined beam for the Msg 3. For example, the UE 104 may select a beam corresponding to the PDCCH candidate having the strongest RSRP.

At 414, in response to receiving Msg 3, base station 102 or the beam selection component 148 may transmit a fourth message (Msg 4), which may be referred to as a contention resolution message, to UE 104 via a PDCCH and a PDSCH. For example, Msg 4 may include a cell radio network temporary identifier (C-RNTI) for UE 104 to use in subsequent communications. The base station 102 may select a beam based on the offset at which the Msg 3 is received. The selected beam may correspond to a sub-beam used to transmit the Msg 2 on the PDCCH candidate that the UE 104 selected as the strongest. The base station 102 may transmit the Msg 4 using the selected beam. The contention resolution component 143 may receive the Msg 4.

In some example scenarios, a collision between two or more UEs 104 requesting access can occur. For instance, two or more UEs 104 may send Msg 1 having a same RACH preamble because the number of RACH preambles may be limited and may be randomly selected by each UE 104 in a contention-based NR RACH procedure. As such, each colliding UE 104 that selects the same RACH preamble will receive the same temporary C-RNTI and the same UL grant, and thus each UE 104 may send a similar Msg 3. In this case, base station 102 may resolve the collision in one or more ways. In a first scenario, a respective Msg 3 from each colliding UE 104 may interfere with the other Msg 3, so base station 102 may not send Msg 4. Then each UE 104 will retransmit Msg 1 with a different RACH preamble. In a second scenario, base station 102 may successfully decode only one Msg 3 and send an ACK message to the UE 104 corresponding to the successfully decoded Msg 3. In a third scenario, base station 102 may successfully decode the Msg 3 from each colliding UE 104, and then send a Msg 4 having a contention resolution identifier (such as an identifier tied to one of the UEs) to each of the colliding UEs. Each colliding UE 104 receives the Msg 4, decodes the Msg 4, and determines if the UE 104 is the correct UE by successfully matching or identifying the contention resolution identifier. Such a problem may not occur in a contention-free NR RACH procedure, as in that case, base station 102 may inform UE 104 of which RACH preamble to use.

FIG. 5 is a diagram 500 illustrating example resources for repetition of a random access message 2. The resources 510 may be located within consecutive slots 520, 522, 524, and 526, which may be during a RAR window. The base station 102 may transmit a repetition of the Msg 2 on PDCCH candidates 530, 532, 534, and 536 of the Msg 3 in each slot 520, 522, 524, and 526 using a different refined beam. The PDCCH candidates 530, 532, 534, and 536 may be located within a random access search space portion of the control resource set (CORESET) 540. That is, each PDCCH candidate 530, 532, 534, and 536 may include the same data, but be transmitted with different beamforming parameters. For example, the base station 102 or the repetition component 146 may utilize different L3 refined beams to transmit each repetition of the Msg 2 on the PDCCH candidates 530, 532, 534, and 536 in a respective slot 520, 522, 524, and 526. The L3 refined beams may be based on an L2 beam used for the Msg 1. That is, the base station 102 may generate different sub-beams of the L2 beam to attempt to improve reception of the Msg 2.

In an aspect, the UE 104 may determine which of the received PDCCH candidates 530, 532, 534, and 536 is the strongest. For example, the UE 104 may perform soft combination of the signals corresponding to the plurality of repeated PDCCH candidates. The UE 104 may perform blind detection of the DCI format 1_0 on the combined signal after the soft combination. Accordingly, the likelihood of successful detection may be increased by the soft combination. The UE 104 may then determine a RSRP for each PDCCH candidate 530, 532, 534, and 536 individually based on the Msg 2. That is, the UE 104 may use the decoded Msg 2 as a reference signal and compare each PDCCH candidate 530, 532, 534, and 536 to the reference signal to determine a respective RSRP for each PDCCH candidate 530, 532, 534, and 536. Accordingly, the RSRP may indicate a quality of each PDCCH candidate 530, 532, 534, and 536.

In an aspect, the base station 102 may determine whether to transmit the repeated random access Msg 2 for a particular UE 104 based on a request from the UE 104. For example, the UE 104 may indicate a request for coverage enhancement or beam enhancement based on one or a combination of: time resources of the PRACH Msg 1, format of the PRACH Msg 1, or a sequence of the PRACH Msg 1. For example, a subset of the available PRACH sequences may be associated with coverage enhancement.

FIG. 6 is a diagram illustrating an example portion of a RAR window 600 for repetition of a random access message 2. For instance, the RAR window 600 may include a first portion 610 for a legacy procedure without PDCCH repetition for Msg 2 and a second portion 620 for a RACH procedure using PDCCH repetition with soft combination over a number of consecutive slots. In an aspect, the base station 102 may transmit a management information block (MIB) or remaining minimum system information (RMSI) indicating the portion of the RAR window 600 configured for PDCCH repetition. For example, a bit field that defines a length of the RAR window 600 may be extended to define the second portion 620. In another aspect, the base station 102 may transmit a MIB or RMSI indicating a number of the plurality of repeated PDCCH candidates, for example, 4 consecutive slots.

Figure 7:
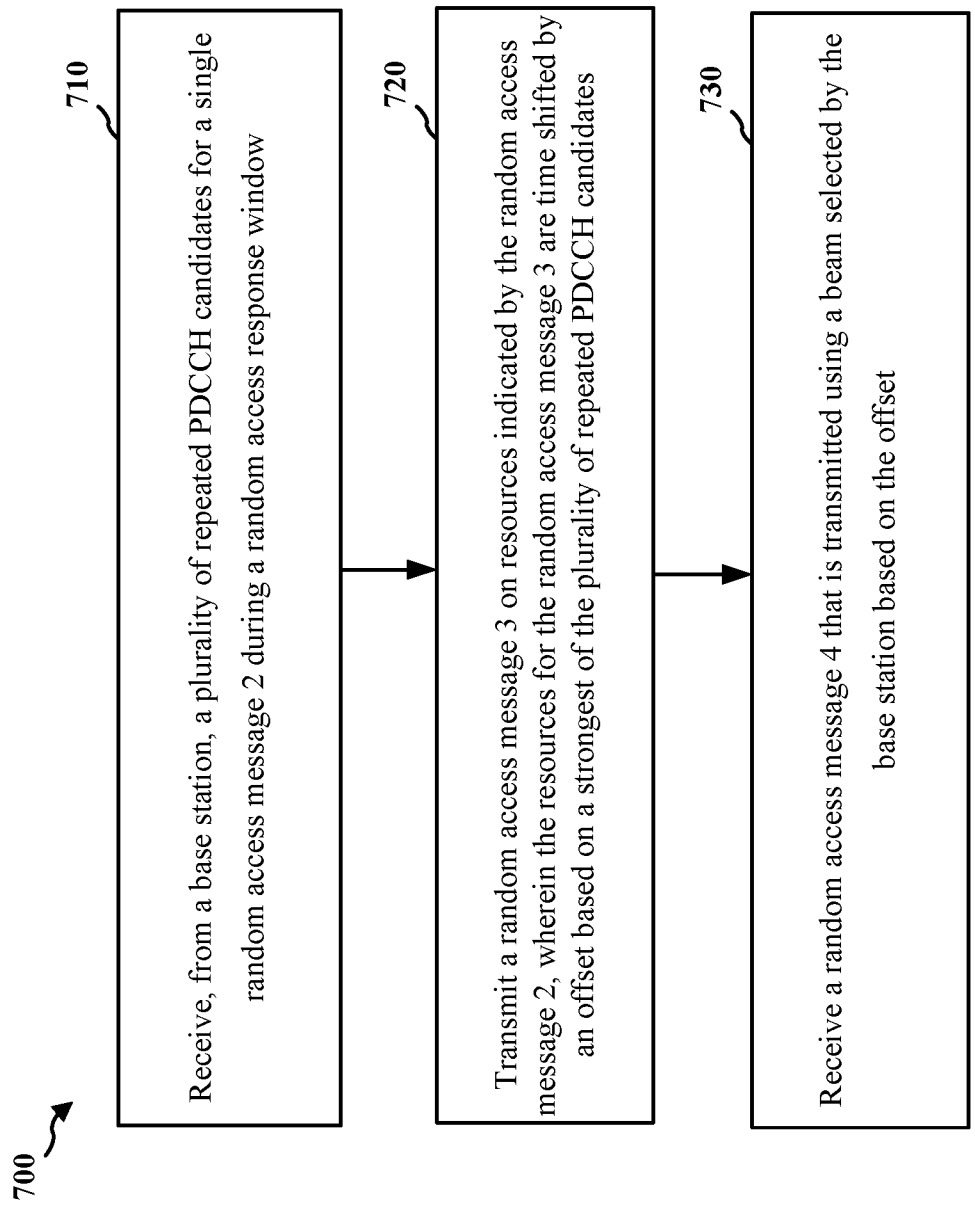
FIG. 7 is a flowchart of an example method for transmitting a random access message 2 during a RACH procedure.

FIG. 7 is a flowchart of an example method 700 for transmitting a random access message 3 during a RACH procedure. The method 700 may be performed by a UE (such as the UE 104, which may include the memory 360 and which may be the entire UE 104 or a component of the UE 104 such as the UE RACH component 140, TX processor 368, the RX processor 356, or the controller/processor 359). The method 700 may be performed by the UE RACH component 140 in communication with the BS RACH component 198 of the base station 102.

At block 710, the method 700 may include receiving a plurality of repeated PDCCH candidates for a single random access message 2 during a random access response window. In an aspect, for example, the UE 104, the RX processor 356 or the controller/processor 359 may execute the UE RACH component 140 or the RAR receiving component 141 to receive the plurality of repeated PDCCH candidates 530, 532, 534, and 536 for a single random access message 2 during a RAR window 600. For example, the RAR receiving component 141 may perform soft combination of the plurality of repeated PDCCH candidates and perform blind detection of downlink control information after the soft combination of the plurality of repeated PDCCH candidates. The RAR receiving component 141 may perform a separate RSRP measurement for each of the plurality of repeated PDCCH candidates. The RAR receiving component 141 may determine the strongest of the plurality of repeated PDCCH candidates based on the measurements. Accordingly, the UE 104, the RX processor 356, or the controller/processor 359 executing the UE RACH component 140 or the RAR receiving component 141 may provide means for receiving a plurality of repeated PDCCH candidates for a single random access message 2 during a random access response window.

At block 720, the method 700 may include transmitting a random access message 3 on resources indicated by the random access message 2. The resources for the random access message 3 are time shifted by an offset based on a strongest of the plurality of repeated PDCCH candidates. In an aspect, for example, the UE 104, the controller/processor 359, or the TX processor 368 may execute the UE RACH component 140 or the offset component 142 to transmit a random access message 3 on resources indicated by the random access message 2 time shifted by the offset based on the strongest of the plurality of repeated PDCCH candidates. In an aspect, the offset component 142 may select an uplink beam for the random access message 3 based on the strongest of the plurality of repeated PDCCH candidates. Accordingly, the UE 104, the TX processor 368, or the controller/processor 359 executing the UE RACH component 140 or the offset component 142 may provide means for transmitting a random access message 3 on resources indicated by the random access message 2 time shifted by an offset based on a strongest of the plurality of repeated PDCCH candidates.

At block 730, the method 700 may include receiving a random access message 4 that is transmitted using a beam selected by the base station based on the offset. In an aspect, for example, the UE 104, the RX processor 356, or the controller/processor 359 may execute the UE RACH component 140 or the contention resolution component 143 to receive a random access message 4 that is transmitted using a beam selected based on the offset. Accordingly, the UE 104, the RX processor 356, or the controller/processor 359 executing the UE RACH component 140 or the contention resolution component 143 may provide means for receiving a random access message 4 that is transmitted using a beam selected by the base station based on the offset.

The method 700 may further include determining a coverage enhancement condition and transmitting a physical random access message 1 that indicates a request for the plurality of repeated PDCCH candidates based on time resources of the physical random access message 1, a format of the physical random access message 1, a sequence of the physical random access message 1, or any combination thereof.

The method 700 may further include determining a coverage enhancement condition and transmitting a physical random access message 1 that indicates a request for the plurality of repeated PDCCH candidates during a portion of the random access response window configured for PDCCH repetition (such as the second portion 620). The method 700 may further include further receiving a management information block or remaining minimum system information indicating the portion of the random access response window configured for PDCCH repetition. The method 700 may further include receiving a management information block or remaining minimum system information indicating a number of the plurality of repeated PDCCH candidates.

Figure 8:
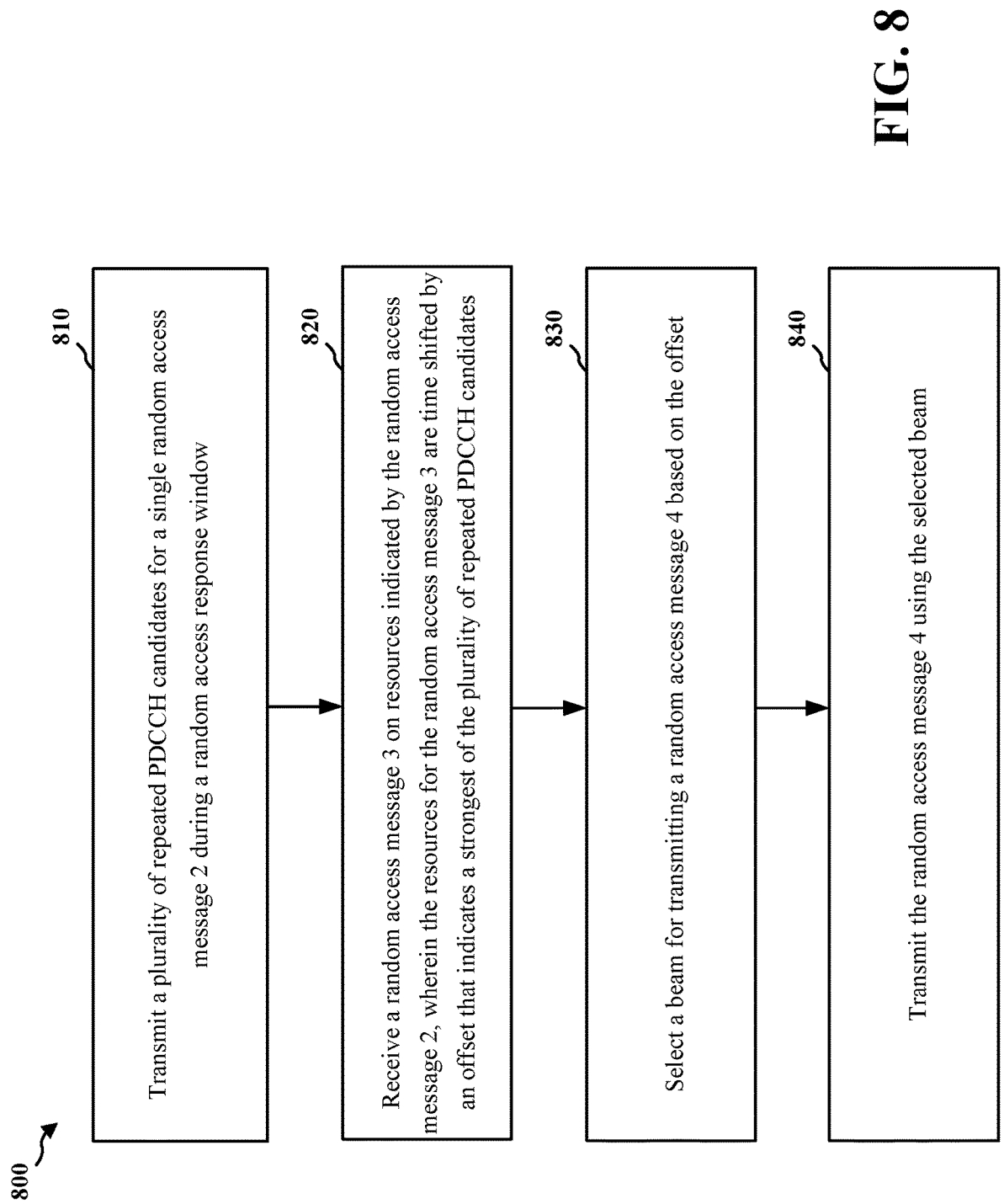
FIG. 8 is a flowchart of an example method for receiving a random access message 2 during a RACH procedure.

FIG. 8 is a flowchart of an example method 800 for transmitting a random access message 2 during a RACH procedure. The method 800 may be performed by a base station (such as the base station 102, which may include the memory 376 and which may be the entire base station 102 or a component of the base station 102 such as the BS RACH component 198, TX processor 316, the RX processor 370, or the controller/processor 375). The method 800 may be performed by the BS RACH component 198 in communication with the UE RACH component 140 of the UE 104.

At block 810, the method 800 may include transmitting a plurality of repeated PDCCH candidates for a single random access message 2 during a random access response window. In an aspect, for example, the base station 102, the TX processor 316, or the controller/processor 375 may execute the BS RACH component 198 or the repetition component 146 to transmit a plurality of repeated PDCCH candidates for a single random access message 2 during a RAR window 600. Accordingly, the base station 102, the TX processor 316, or the controller/processor 375 executing the BS RACH component 198 or the repetition component 146 may provide means for transmitting a plurality of repeated PDCCH candidates for a single random access message 2 during a random access response window.

At block 820, the method 800 may include receiving a random access message 3 on resources indicated by the random access message 2. The resources for the random access message 3 may be time shifted by an offset that indicates a strongest of the plurality of repeated PDCCH candidates. In an aspect, for example, the base station 102, the RX processor 370, or the controller/processor 375 may execute the BS RACH component 198 or the detection component 147 to receive a random access message 3 on resources indicated by the random access message 2. Accordingly, the base station 102, the RX processor 370, or the controller/processor 375 executing the BS RACH component 198 or the detection component 147 may provide means receiving a random access message 3 on resources indicated by the random access message 2.

At block 830, the method 800 may include selecting a beam for transmitting a random access message 4 based on the offset. In an aspect, for example, the base station 102, the TX processor 316, or the controller/processor 375 may execute the BS RACH component 198 or the beam selection component 148 to select the beam for transmitting a random access message 4 based on the offset. The beam selection component 148 may determine the offset at which the random access message 3 is received and select a refined beam corresponding to the offset. Accordingly, the base station 102, the RX processor 370, or the controller/processor 375 executing the BS RACH component 198 or the beam selection component 148 may provide means selecting a beam for transmitting a random access message 4 based on the offset.

At block 840, the method 800 may include transmitting the random access message 4 using the selected beam. In an aspect, for example, the base station 102, the TX processor 316, or the controller/processor 375 may execute the BS RACH component 198 to transmit the random access message 4 using the selected beam. Accordingly, the base station 102, the TX processor 316, or the controller/processor 375 executing the BS RACH component 198 may provide means for transmitting the random access message 4 using the selected beam.

Figure 9:
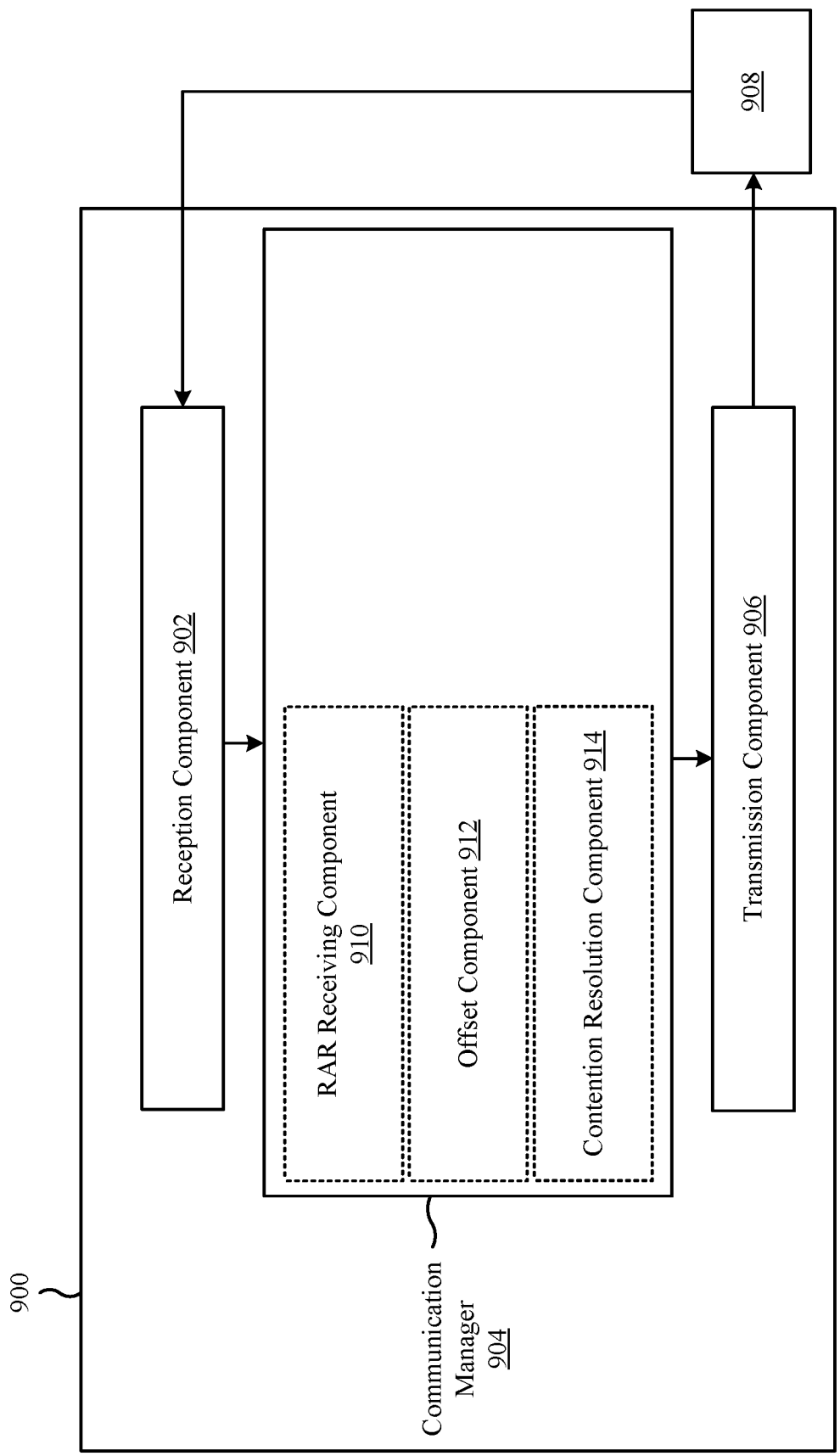
FIG. 9 is a block diagram of an example apparatus such as a UE, for wireless communication.

FIG. 9 is a block diagram of an example apparatus 900 for wireless communication. The apparatus 900 may be a UE or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 4 to 6. Additionally or alternatively, the apparatus 900 may be configured to perform one or more processes described herein, such as method 700 of FIG. 7. In some aspects, the apparatus 900 may include one or more components of the UE described above in connection with FIG. 1.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 1.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 1. In some aspects, the transmission component 906 may be collocated with the reception component 902 in a transceiver.

The communication manager 904 may receive a plurality of repeated PDCCH candidates for a single random access message 2 during a random access response window; transmit a random access message 3 on resources indicated by the random access message 2. The resources for the random access message 3 are time shifted by an offset selected based on a strongest of the plurality of repeated PDCCH candidates. The communication manager 904 may receive a random access message 4 that is transmitted using a beam selected based on the offset. In some aspects, the communication manager 904 may include a controller/processor, a memory, or a combination thereof, of the UE described above in connection with FIG. 1.

In some aspects, the communication manager 904 may include a set of components, such as a RAR receiving component 910, an offset component 912, a contention resolution component 914 or a combination thereof. Alternatively, the set of components may be separate and distinct from the communication manager 904. In some aspects, one or more components of the set of components may include or may be implemented within a controller/processor, a memory, or a combination thereof, of the UE described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The RAR receiving component 910 may receive a plurality of repeated PDCCH candidates for a single random access message 2 during a random access response window. The offset component 912 may transmit a random access message 3 on resources indicated by the random access message 2. The resources for the random access message 3 are time shifted by an offset selected based on a strongest of the plurality of repeated PDCCH candidates. The contention resolution component 914 may receive a random access message 4 that is transmitted using a beam selected based on the offset.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
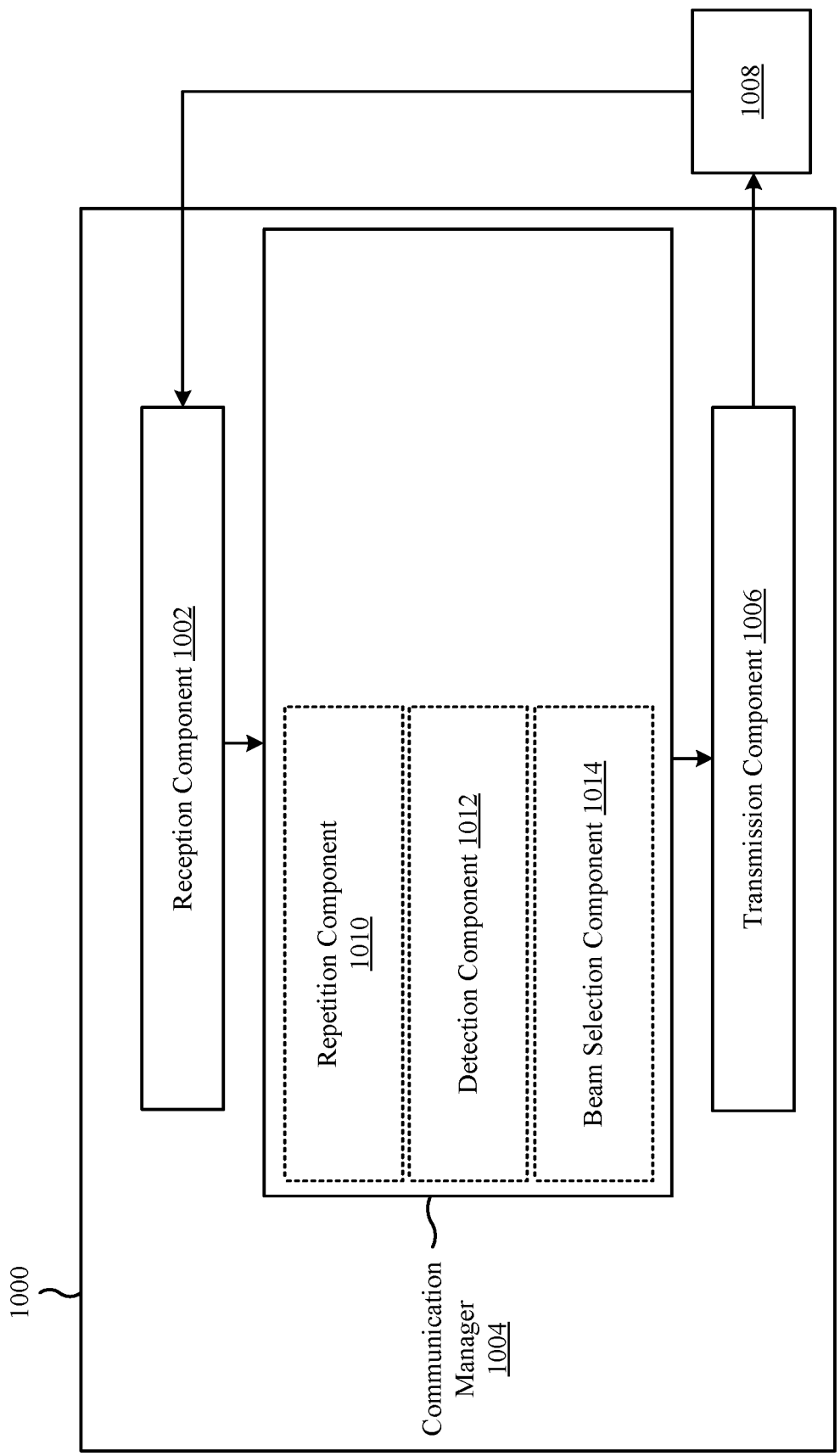
FIG. 10 is a block diagram of an example apparatus such as a base station, for wireless communication.

FIG. 10 is a block diagram of an example apparatus 1000 for wireless communication. The apparatus 1000 may be a base station or a base station may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 4 to 6. Additionally or alternatively, the apparatus 1000 may be configured to perform one or more processes described herein, such as method 800 of FIG. 8. In some aspects, the apparatus 1000 may include one or more components of the base station described above in connection with FIG. 1.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 1.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 1. In some aspects, the transmission component 1006 may be collocated with the reception component 1002 in a transceiver.

The communication manager 1004 may transmit a plurality of repeated PDCCH candidates for a single random access message 2 during a random access response window; receive a random access message 3 on resources indicated by the random access message 2. The resources for the random access message 3 are time shifted by an offset selected based on a strongest of the plurality of repeated PDCCH candidates. The communication manager 1004 may select a beam based on the offset; and transmit a random access message 4 using the selected beam. In some aspects, the communication manager 1004 may include a controller/processor, a memory, a scheduler, a communication unit, or a combination thereof, of the base station described above in connection with FIG. 1.

In some aspects, the communication manager 1004 may include a set of components, such as a repetition component 1010, a detection component 1012, a beam selection component 148, or a combination thereof. Alternatively, the set of components may be separate and distinct from the communication manager 1004. In some aspects, one or more components of the set of components may include or may be implemented within a controller/processor, a memory, a scheduler, a communication unit, or a combination thereof, of the base station described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The repetition component 1010 may transmit a plurality of repeated PDCCH candidates for a single random access message 2 during a random access response window. The detection component 1012 may receive a random access message 3 on resources indicated by the random access message 2. The beam selection component 1014 may select a beam based on the offset receive the random access message 3 for a number of repetitions, each repetition using a different refined beam. The transmission component 1006 may transmit a random access message 4 using the selected beam.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 1.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

SOME FURTHER EXAMPLE CLAUSES

Implementation examples are described in the following numbered clauses:

1. A method of wireless communication, including:
receiving, from a base station, a plurality of repeated physical downlink control channel (PDCCH) candidates for a single random access message 2 during a random access response window;
transmitting a random access message 3 on resources indicated by the random access message 2, wherein the resources for the random access message 3 are time shifted by an offset based on a strongest of the plurality of repeated PDCCH candidates; and
receiving a random access message 4 that is transmitted using a beam selected by the base station based on the offset.

2. The method of clause 1, where receiving the plurality of repeated PDCCH candidates includes:
performing soft combination of the plurality of repeated PDCCH candidates;
performing blind detection of downlink control information after the soft combination of the plurality of repeated PDCCH candidates;
performing a separate reference signal received power (RSRP) measurement for each of the plurality of repeated PDCCH candidates; and
determining the strongest of the plurality of repeated PDCCH candidates based on the RSRP measurements.

3. The method of clause 1 or 2, further including selecting an uplink beam for the random access message 3 based on the strongest of the plurality of repeated PDCCH candidates.

4. The method of any of clauses 1-3, further including transmitting a physical random access message 1 that indicates a request for the plurality of repeated PDCCH candidates based on time resources of the physical random access message 1, a format of the physical random access message 1, a sequence of the physical random access message 1, or any combination thereof in response to a coverage enhancement condition.

5. The method of any of clauses 1-3, further including transmitting a physical random access message 1 that indicates a request for the plurality of repeated PDCCH candidates during a portion of the random access response window configured for PDCCH repetition in response to a coverage enhancement condition.

6. The method of clause 5, further including receiving a management information block or remaining minimum system information indicating the portion of the random access response window configured for PDCCH repetition.

7. The method of any of clauses 1-6, further including receiving a management information block or remaining minimum system information indicating a number of the repeated PDCCH candidates.

8. A method of wireless communication, including:
transmitting a plurality of repeated physical downlink control channel (PDCCH) candidates to a user equipment (UE) for a single random access message 2 during a random access response window;
receiving a random access message 3 from the UE on resources indicated by the random access message 2, wherein the resources for the random access message 3 are time shifted by an offset that indicates a strongest of the plurality of repeated PDCCH candidates;
selecting a beam for transmitting a random access message 4 based on the offset; and
transmitting a random access message 4 using the selected beam.

9. The method of clause 8, further including:
receiving a physical random access message 1 from the UE; and
determining that the physical random access message 1 indicates a request for the plurality of repeated PDCCH candidates based on time resources of the physical random access message 1, a format of the physical random access message 1, a sequence of the physical random access message 1, or any combination thereof.

10. The method of clause 8, further including:
receiving a physical random access message 1 from the UE; and
determining that the physical random access message 1 indicates a request for the plurality of repeated PDCCH candidates based on a portion of the random access response window being configured for PDCCH repetition.

11. The method of clause 10, further including transmitting a management information block or remaining minimum system information indicating the portion of the random access response window configured for PDCCH repetition.

12. The method of any of clauses 8-11, further including transmitting a management information block or remaining minimum system information indicating a number of the repeated PDCCH candidates.

13. The method of any of clauses 8-12, where receiving the random access message 3 on the resources indicated by the random access message 2 includes sweeping refined beams for receiving the random access message 3 over a plurality of potential offsets of the resources indicated by the random access message 2 with a different refined beam corresponding to each potential offset.

14. The method of clause 13, where selecting the beam based on the offset includes:
   determining the offset at which the random access message 3 is received; and
   selecting a refined beam corresponding to the offset as the selected beam for transmitting the random access message 4.

15. The method of any of clauses 8-14, where the beam for reception of message 3 corresponds to a beam used for transmission of message 2.

16. An apparatus for wireless communication, including:
   a memory storing computer executable instructions; and
   at least one processor coupled to the memory and configured to execute the instructions to:
      receive, from a base station, a plurality of repeated physical downlink control channel (PDCCH) candidates for a single random access message 2 during a random access response window;
      transmit a random access message 3 on resources indicated by the random access message 2, wherein the resources for the random access message 3 are time shifted by an offset based on a strongest of the plurality of repeated PDCCH candidates; and
      receive a random access message 4 that is transmitted using a beam selected by the base station based on the offset.

17. The apparatus of clause 16, where the at least one processor is configured to:
   perform soft combination of the plurality of repeated PDCCH candidates;
   perform blind detection of downlink control information after the soft combination of the plurality of repeated PDCCH candidates;
   perform a separate reference signal received power (RSRP) measurement for each of the plurality of repeated PDCCH candidates; and
   determine the strongest of the plurality of repeated PDCCH candidates based on the measurements.

18. The apparatus of clause 16 or 17, where the at least one processor is configured to select an uplink beam for the random access message 3 based on the strongest of the plurality of repeated PDCCH candidates.

19. The apparatus of any of clauses 16-18, where the at least one processor is configured to transmit a physical random access message 1 that indicates a request for the plurality of repeated PDCCH candidates based on time resources of the physical random access message 1, a format of the physical random access message 1, a sequence of the physical random access message 1, or any combination thereof in response to a coverage enhancement condition.

20. The apparatus of any of clauses 16-18, where the at least one processor is configured to transmit a physical random access message 1 that indicates a request for the plurality of repeated PDCCH candidates during a portion of the random access response window configured for PDCCH repetition in response to a coverage enhancement condition.

21. The apparatus of clause 20, where the at least one processor is configured to receive a management information block or remaining minimum system information indicating the portion of the random access response window configured for PDCCH repetition.

22. The apparatus of any of clauses 16-20, where the at least one processor is configured to receive a management information block or remaining minimum system information indicating a number of the repeated PDCCH candidates.

23. An apparatus for wireless communication, including:
   a memory storing computer executable instructions; and
   at least one processor coupled to the memory and configured to execute the instructions to:
      transmit a plurality of repeated physical downlink control channel (PDCCH) candidates for a single random access message 2 during a random access response window;
      receive a random access message 3 on resources indicated by the random access message 2, wherein the resources for the random access message 3 are time shifted by an offset that indicates a strongest of the plurality of repeated PDCCH candidates;
      select a beam based on the offset; and
      transmit a random access message 4 using the selected beam.

24. The apparatus of clause 23, where the at least one processor is configured to:
   receive a physical random access message 1 from a user equipment; and
   determine that the physical random access message 1 indicates a request for the plurality of repeated PDCCH candidates based on time resources of the physical random access message 1, a format of the physical random access message 1, a sequence of the physical random access message 1, or any combination thereof.

25. The apparatus of clause 23, where the at least one processor is configured to:
   receive a physical random access message 1 from a user equipment; and
   determine that the physical random access message 1 indicates a request for the plurality of repeated PDCCH candidates based on a portion of the random access response window being configured for PDCCH repetition.

26. The apparatus of clause 25, where the at least one processor is configured to transmit a management information block or remaining minimum system information indicating the portion of the random access response window configured for PDCCH repetition.

27. The apparatus of any of clauses 23-26, where the at least one processor is configured to transmit a management information block or remaining minimum system information indicating a number of the repeated PDCCH candidates.

28. The apparatus of any of clauses 23-26, where the at least one processor is configured to sweep refined beams for receiving the random access message 3 over a plurality of potential offsets of the resources indicated by the random access message 2 with a different refined beam corresponding to each potential offset.

29. The apparatus of clause 28, where the at least one processor is configured to:
   determine the offset at which the random access message 3 is received; and
   select a refined beam corresponding to the offset.
30. The apparatus of any of clauses 23-29, where the beam for reception of message 3 corresponds to a beam used for transmission of message 2.
31. An apparatus for wireless communication, including:
   means for receiving, from a base station, a plurality of repeated physical downlink control channel (PDCCH) candidates for a single random access message 2 during a random access response window;
   means for transmitting a random access message 3 on resources indicated by the random access message 2, wherein the resources for the random access message 3 are time shifted by an offset based on a strongest of the plurality of repeated PDCCH candidates; and
   means for receiving a random access message 4 that is transmitted using a beam selected by the base station based on the offset.
32. The apparatus of clause 31, where the means for receiving the plurality of repeated PDCCH candidates is configured to:
   perform soft combination of the plurality of repeated PDCCH candidates;
   perform blind detection of downlink control information after the soft combination of the plurality of repeated PDCCH candidates; and
   perform a separate reference signal received power (RSRP) measurement for each of the plurality of repeated PDCCH candidates; and
   determine the strongest of the plurality of repeated PDCCH candidates based on the RSRP measurements.
33. The apparatus of clause 31 or 32, further including means for selecting an uplink beam for the random access message 3 based on the strongest of the plurality of repeated PDCCH candidates.
34. The apparatus of any of clauses 31-33, further including means for transmitting a physical random access message 1 that indicates a request for the plurality of repeated PDCCH candidates based on time resources of the physical random access message 1, a format of the physical random access message 1, a sequence of the physical random access message 1, or any combination thereof in response to a coverage enhancement condition.
35. The apparatus of any of clauses 31-33, further including means for transmitting a physical random access message 1 that indicates a request for the plurality of repeated PDCCH candidates during a portion of the random access response window configured for PDCCH repetition in response to a coverage enhancement condition.
36. The apparatus of clause 35, further including means for receiving a management information block or remaining minimum system information indicating the portion of the random access response window configured for PDCCH repetition.
37. The apparatus of any of clauses 31-35, further including means for receiving a management information block or remaining minimum system information indicating a number of the plurality of repeated PDCCH candidates.
38. An apparatus for wireless communication, including:
   means for transmitting a plurality of repeated physical downlink control channel (PDCCH) candidates to a user equipment (UE) for a single random access message 2 during a random access response window;
   means for receiving a random access message 3 from the UE on resources indicated by the random access message 2, wherein the resources for the random access message 3 are time shifted by an offset that indicates a strongest of the plurality of repeated PDCCH candidates;
   means for selecting a beam for transmitting a random access message 4 based on the offset; and
   means for transmitting the random access message 4 using the selected beam.
39. The apparatus of clause 38, further including:
   means for receiving a physical random access message 1 from the UE; and
   means for determining that the physical random access message 1 indicates a request for the plurality of repeated PDCCH candidates based on time resources of the physical random access message 1, a format of the physical random access message 1, a sequence of the physical random access message 1, or any combination thereof.
40. The apparatus of clause 38, further including:
   means for receiving a physical random access message 1 from the UE; and
   means for determining that the physical random access message 1 indicates a request for the plurality of repeated PDCCH candidates based on a portion of the random access response window being configured for PDCCH repetition.
41. The apparatus of clause 40, further including means for transmitting a management information block or remaining minimum system information indicating the portion of the random access response window configured for PDCCH repetition.
42. The apparatus of any of clauses 38-41, further including means transmitting a management information block or remaining minimum system information indicating a number of the plurality of repeated PDCCH candidates.
43. The apparatus of any of clauses 38-42, where the means for receiving the random access message 3 on the resources indicated by the random access message 2 is configured to sweep refined beams for receiving the random access message 3 over a plurality of potential offsets of the resources indicated by the random access message 2 with a different refined beam corresponding to each potential offset.
44. The apparatus of clause 43, where the means for selecting the beam based on the offset is configured to:
   determine the offset at which the random access message 3 is received; and
   select a refined beam corresponding to the offset as the selected beam for transmitting the random access message 4.
45. The method of any of clauses 38-44, where the beam for reception of message 3 corresponds to a beam used for transmission of message 2.
46. A non-transitory computer-readable medium storing computer executable code, the code when executed by a processor cause the processor to:
   receive, from a base station, a plurality of repeated physical downlink control channel (PDCCH) candidates for a single random access message 2 during a random access response window;
   transmit a random access message 3 on resources indicated by the random access message 2, wherein the resources for the random access message 3 are time shifted by an offset based on a strongest of the plurality of repeated PDCCH candidates; and receive a random access message 4 that is transmitted using a beam selected by the base station based on the offset.

47. The non-transitory computer-readable medium of clause 46, further including instructions to:
perform soft combination of the plurality of repeated PDCCH candidates;
perform blind detection of downlink control information after the soft combination of the plurality of repeated PDCCH candidates;
perform a separate reference signal received power (RSRP) measurement for each of the plurality of repeated PDCCH candidates; and
determine the strongest of the plurality of repeated PDCCH candidates based on the measurements.

48. The non-transitory computer-readable medium of clause 46 or 47, further including instructions to select an uplink beam for the random access message 3 based on the strongest of the plurality of repeated PDCCH candidates.

49. The non-transitory computer-readable medium of any of clauses 46-48, further including instructions to transmit a physical random access message 1 that indicates a request for the plurality of repeated PDCCH candidates based on time resources of the physical random access message 1, a format of the physical random access message 1, a sequence of the physical random access message 1, or any combination thereof in response to a coverage enhancement condition.

50. The non-transitory computer-readable medium of any of clauses 46-48, further including instructions to transmit a physical random access message 1 that indicates a request for the plurality of repeated PDCCH candidates during a portion of the random access response window configured for PDCCH repetition in response to a coverage enhancement condition.

51. The non-transitory computer-readable medium of clause 48, further including instructions to receive a management information block or remaining minimum system information indicating the portion of the random access response window configured for PDCCH repetition.

52. The non-transitory computer-readable medium of any of clauses 46-51, further including instructions to receive a management information block or remaining minimum system information indicating a number of the plurality of repeated PDCCH candidates.

53. A non-transitory computer-readable medium storing computer executable code, the code when executed by a processor cause the processor to:
transmit a plurality of repeated physical downlink control channel (PDCCH) candidates for a single random access message 2 during a random access response window;
receive a random access message 3 on resources indicated by the random access message 2, wherein the resources for the random access message 3 are time shifted by an offset that indicates a strongest of the plurality of repeated PDCCH candidates;
select a beam for transmitting a random access message 4 based on the offset; and
transmit the random access message 4 using the selected beam.

54. The non-transitory computer-readable medium of clause 53, further including code to:
receive a physical random access message 1 from a user equipment; and
determine that the physical random access message 1 indicates a request for the plurality of repeated PDCCH candidates based on time resources of the physical random access message 1, a format of the physical random access message 1, a sequence of the physical random access message 1, or any combination thereof.

55. The non-transitory computer-readable medium of clause 53, further including code to:
receive a physical random access message 1 from a user equipment; and
determine that the physical random access message 1 indicates a request for the plurality of repeated PDCCH candidates based on a portion of the random access response window being configured for PDCCH repetition.

56. The non-transitory computer-readable medium of clause 55, further including code to transmit a management information block or remaining minimum system information indicating the portion of the random access response window configured for PDCCH repetition.

57. The non-transitory computer-readable medium of any of clauses 53-56, further including transmit a management information block or remaining minimum system information indicating a number of the plurality of repeated PDCCH candidates.

58. The non-transitory computer-readable medium of any of clauses 53-57, further including code to sweep refined beams for receiving the random access message 3 over a plurality of potential offsets of the resources indicated by the random access message 2 with a different refined beam corresponding to each potential offset.

59. The non-transitory computer-readable medium of clause 58, further including code to:
determine the offset at which the random access message 3 is received; and
select a refined beam corresponding to the offset as the selected beam for transmitting the random access message 4.

60. The non-transitory computer-readable medium of any of clauses 53-59, where the beam for reception of message 3 corresponds to a beam used for transmission of message 2.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   receiving, from a network node, a plurality of repeated physical downlink control channel (PDCCH) candidates for a single random access message 2 during a random access response window;
   transmitting, to the network node, a random access message 3 on resources indicated by the random access message 2, the resources for the random access message 3 being time shifted by an offset associated with a strongest of the plurality of repeated PDCCH candidates; and
   receiving, from the network node, a random access message 4 that is transmitted using a beam associated with the offset.

2. The method of claim 1, wherein receiving the plurality of repeated PDCCH candidates comprises:
   performing soft combination of the plurality of repeated PDCCH candidates;
   performing blind detection of downlink control information after the soft combination of the plurality of repeated PDCCH candidates;
   performing a separate reference signal received power (RSRP) measurement for each of the plurality of repeated PDCCH candidates; and
   determining the strongest of the plurality of repeated PDCCH candidates based on the RSRP measurements.

3. The method of claim 1, further comprising selecting an uplink beam for the random access message 3 based on the strongest of the plurality of repeated PDCCH candidates.

4. The method of claim 1, further comprising transmitting a physical random access message 1 that indicates a request for the plurality of repeated PDCCH candidates based on time resources of the physical random access message 1, a format of the physical random access message 1, a sequence of the physical random access message 1, or any combination thereof in response to a coverage enhancement condition.

5. The method of claim 1, further comprising transmitting a physical random access message 1 that indicates a request for the plurality of repeated PDCCH candidates during a portion of the random access response window configured for PDCCH repetition in response to a coverage enhancement condition.

6. The method of claim 5, further comprising receiving a management information block or remaining minimum system information indicating the portion of the random access response window configured for PDCCH repetition.

7. The method of claim 1, further comprising receiving a management information block or remaining minimum system information indicating a number of the plurality of repeated PDCCH candidates.

8. A method of wireless communication, comprising:
   transmitting a plurality of repeated physical downlink control channel (PDCCH) candidates to a user equipment (UE) for a single random access message 2 during a random access response window;
   receiving a random access message 3 from the UE on resources indicated by the random access message 2, the resources for the random access message 3 being time shifted by an offset associated with a strongest of the plurality of repeated PDCCH candidates;
   selecting a beam associated with the offset for transmitting a random access message 4; and
   transmitting the random access message 4, to the UE, using the selected beam.

9. The method of claim 8, further comprising:
   receiving a physical random access message 1 from the UE; and
   determining that the physical random access message 1 indicates a request for the plurality of repeated PDCCH candidates based on time resources of the physical random access message 1, a format of the physical random access message 1, a sequence of the physical random access message 1, or any combination thereof.

10. The method of claim 8, further comprising:
    receiving a physical random access message 1 from the UE; and
    determining that the physical random access message 1 indicates a request for the plurality of repeated PDCCH candidates based on a portion of the random access response window being configured for PDCCH repetition.

11. The method of claim 10, further comprising transmitting a management information block or remaining minimum system information indicating the portion of the random access response window configured for PDCCH repetition.

12. The method of claim 8, further comprising transmitting a management information block or remaining minimum system information indicating a number of the plurality of repeated PDCCH candidates.

13. The method of claim 8, wherein receiving the random access message 3 on the resources indicated by the random access message 2 comprises sweeping refined beams for receiving the random access message 3 over a plurality of potential offsets of the resources indicated by the random access message 2 with a different refined beam corresponding to each potential offset.

14. The method of claim 13, wherein selecting the beam associated with the offset comprises:
    determining the offset at which the random access message 3 is received; and
    selecting a refined beam corresponding to the offset as the selected beam for transmitting the random access message 4.

15. The method of claim 8, wherein the beam for reception of the random access message 3 corresponds to a beam used for transmission of the random access message 2.

16. An apparatus for wireless communication, comprising:
    a memory storing computer executable instructions; and
    at least one processor coupled to the memory and configured to execute the instructions to:
      receive, from a network node, a plurality of repeated physical downlink control channel (PDCCH) candidates for a single random access message 2 during a random access response window;
      transmit, to the network node, a random access message 3 on resources indicated by the random access message 2, the resources for the random access message 3 being time shifted by an offset associated with a strongest of the plurality of repeated PDCCH candidates; and
receive, from the network node, a random access message 4 that is transmitted using a beam associated with the offset.

17. The apparatus of claim 16, wherein the at least one processor is configured to:
perform soft combination of the plurality of repeated PDCCH candidates;
perform blind detection of downlink control information after the soft combination of the plurality of repeated PDCCH candidates;
perform a separate reference signal received power (RSRP) measurement for each of the plurality of repeated PDCCH candidates; and
determine the strongest of the plurality of repeated PDCCH candidates based on the measurements.

18. The apparatus of claim 16, wherein the at least one processor is configured to select an uplink beam for the random access message 3 based on the strongest of the plurality of repeated PDCCH candidates.

19. The apparatus of claim 16, wherein the at least one processor is configured to transmit a physical random access message 1 that indicates a request for the plurality of repeated PDCCH candidates based on time resources of the physical random access message 1, a format of the physical random access message 1, a sequence of the physical random access message 1, or any combination thereof in response to a coverage enhancement condition.

20. The apparatus of claim 16, wherein the at least one processor is configured to transmit a physical random access message 1 that indicates a request for the plurality of repeated PDCCH candidates during a portion of the random access response window configured for PDCCH repetition in response to a coverage enhancement condition.

21. The apparatus of claim 20, wherein the at least one processor is configured to receive a management information block or remaining minimum system information indicating the portion of the random access response window configured for PDCCH repetition.

22. The apparatus of claim 16, wherein the at least one processor is configured to receive a management information block or remaining minimum system information indicating a number of the plurality of repeated PDCCH candidates.

23. An apparatus for wireless communication, comprising:
a memory storing computer executable instructions; and
at least one processor coupled to the memory and configured to execute the instructions to:
transmit a plurality of repeated physical downlink control channel (PDCCH) candidates to a user equipment (UE) for a single random access message 2 during a random access response window;
receive, from the UE, a random access message 3 on resources indicated by the random access message 2, the resources for the random access message 3 being time shifted by an offset associated with a strongest of the plurality of repeated PDCCH candidates;
select a beam associated with the offset for transmitting a random access message 4; and
transmit the random access message 4, to the UE, using the selected beam.

24. The apparatus of claim 23, wherein the at least one processor is configured to:
receive a physical random access message 1 from the UE; and
determine that the physical random access message 1 indicates a request for the plurality of repeated PDCCH candidates based on time resources of the physical random access message 1, a format of the physical random access message 1, a sequence of the physical random access message 1, or any combination thereof.

25. The apparatus of claim 23, wherein the at least one processor is configured to:
receive a physical random access message 1 from the UE; and
determine that the physical random access message 1 indicates a request for the plurality of repeated PDCCH candidates based on a portion of the random access response window being configured for PDCCH repetition.

26. The apparatus of claim 25, wherein the at least one processor is configured to transmit a management information block or remaining minimum system information indicating the portion of the random access response window configured for PDCCH repetition.

27. The apparatus of claim 23, wherein the at least one processor is configured to transmit a management information block or remaining minimum system information indicating a number of the plurality of repeated PDCCH candidates.

28. The apparatus of claim 23, wherein the at least one processor is configured to sweep refined beams for receiving the random access message 3 over a plurality of potential offsets of the resources indicated by the random access message 2 with a different refined beam corresponding to each potential offset.

29. The apparatus of claim 28, wherein the at least one processor is configured to:
determine the offset at which the random access message 3 is received; and
select a refined beam corresponding to the offset as the selected beam for transmitting the random access message 4.

30. The apparatus of claim 23, wherein the beam for reception of the random access message 3 corresponds to a beam used for transmission of the random access message 2.

31. The method of claim 1, wherein the random access response window includes a first portion for a legacy procedure without PDCCH repetition for message 2, and a second portion configured for a random access procedure using PDCCH repetition with soft combination over a number of consecutive slots, and wherein each respective repeated PDCCH candidate of the plurality of repeated PDCCH candidates is located within a respective random access search space portion of a control resource set, CORESET, of a respective slot of the number of consecutive slots during the random access response window.

32. The method of claim 8, wherein the random access response window includes a first portion for a legacy procedure without PDCCH repetition for message 2, and a second portion configured for a random access procedure using PDCCH repetition with soft combination over a number of consecutive slots, and wherein each respective repeated PDCCH candidate of the plurality of repeated PDCCH candidates is located within a respective random access search space portion of a control resource set, CORESET, of a respective slot of the number of consecutive slots during the random access response window.

33. The apparatus of claim 16, wherein the random access response window includes a first portion for a legacy procedure without PDCCH repetition for message 2, and a second portion configured for a random access procedure using PDCCH repetition with soft combination over a number of consecutive slots, and wherein each respective repeated PDCCH candidate of the plurality of repeated PDCCH candidates is located within a respective random access search space portion of a control resource set, CORESET, of a respective slot of the number of consecutive slots during the random access response window.

34. The apparatus of claim 23, wherein the random access response window includes a first portion for a legacy procedure without PDCCH repetition for message 2, and a second portion configured for a random access procedure using PDCCH repetition with soft combination over a number of consecutive slots, and wherein each respective repeated PDCCH candidate of the plurality of repeated PDCCH candidates is located within a respective random access search space portion of a control resource set, CORESET, of a respective slot of the number of consecutive slots during the random access response window.

\* \* \* \* \*